C. A. HANINGTON
Feb. 16, 1932. METHOD FOR DECORATING FLEXIBLE MATERIAL Re. 18,351
Original Filed Jan. 16, 1926 2 Sheets-Sheet 1
Fig. 2.
Fig. 1.
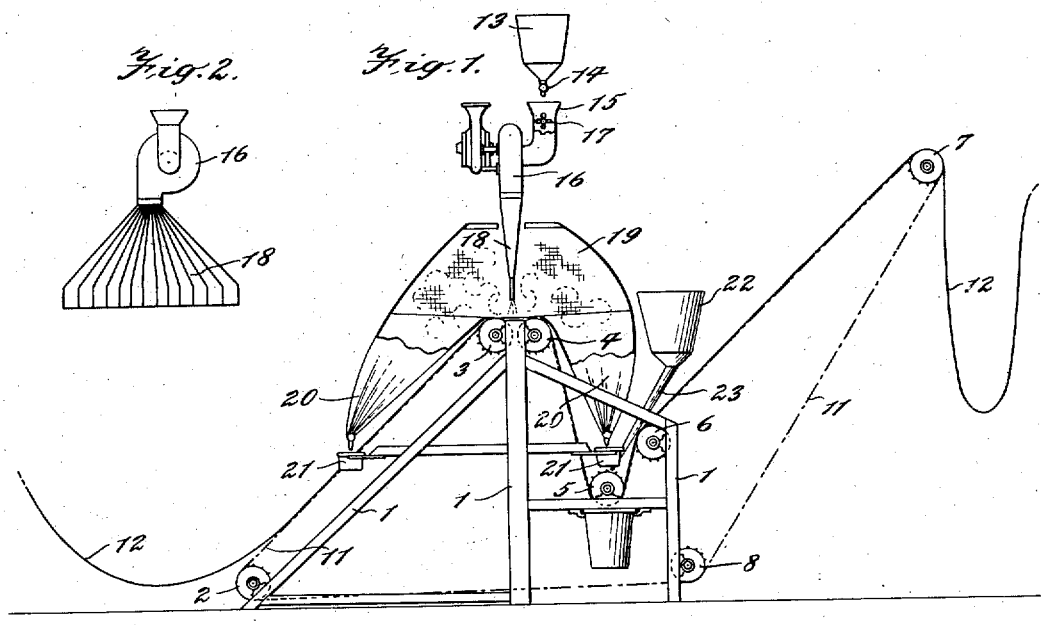
Fig. 3.
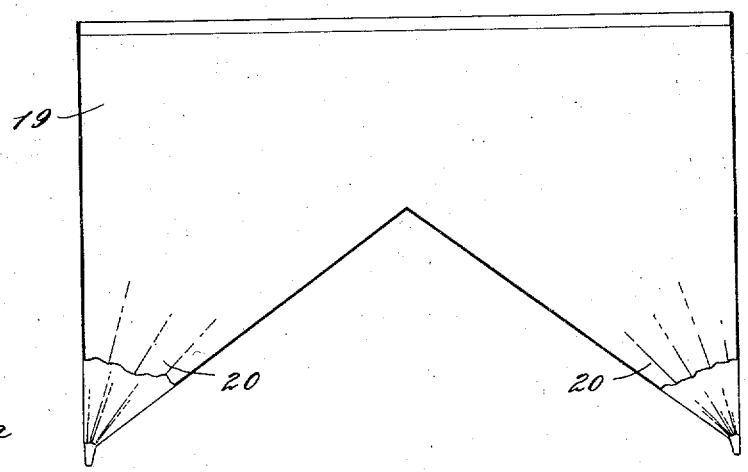
Fig. 5.
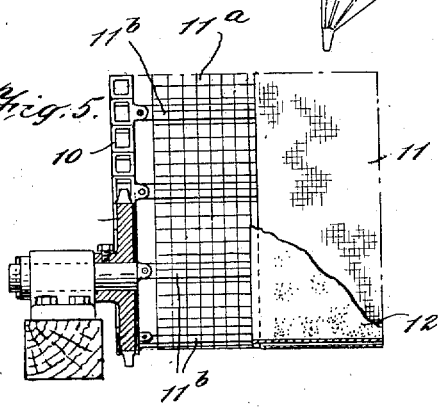
INVENTOR
Chas. A. Hanington
BY Gifford + Scull
ATTORNEYS.

C. A. HANINGTON

Feb. 16, 1932. METHOD FOR DECORATING FLEXIBLE MATERIAL Re. 18,351

Original Filed Jan. 16, 1926 2 Sheets-Sheet 2

INVENTOR
Chas. A. Hanington
BY
Wilford & Pell
ATTORNEYS.

Reissued Feb. 16, 1932

Re. 18,351

UNITED STATES PATENT OFFICE

CHARLES A. HANINGTON, OF FREEPORT, NEW YORK

METHOD FOR DECORATING FLEXIBLE MATERIAL

Original No. 1,741,770, dated December 31, 1929, Serial No. 81,660, filed January 16, 1928. Application for reissue filed December 8, 1931. Serial No. 579,814.

My invention relates to a novel and improved method for applying a surfacing material to a sheet of flexible material, such, for instance, as cloth in the piece, or paper. More specifically, the invention may be used where the flexible material is provided with a plurality of designs spaced apart on its surface, although the invention is equally applicable where the entire surface of the flexible material is to be covered with the surfacing material.

More specifically still, the invention is directed to the decoration of such flexible material by the application thereto of a design, and imbedding in the design material one or more kinds of decorative substances as, for instance, metallic particles and/or beads.

My invention will be better understood by reading the following description taken in connection with the accompanying drawings forming a part thereof, and in which—

Fig. 1 is a side elevation of apparatus suitable for carrying out my process;

Fig. 2 is a side elevation of one of the means for forcing the decorative material onto the designs;

Fig. 3 is a front elevation of the means for catching and collecting some of the excess decorating material;

Fig. 5 is a detail showing means for carrying the goods through the machine;

Figure 4:
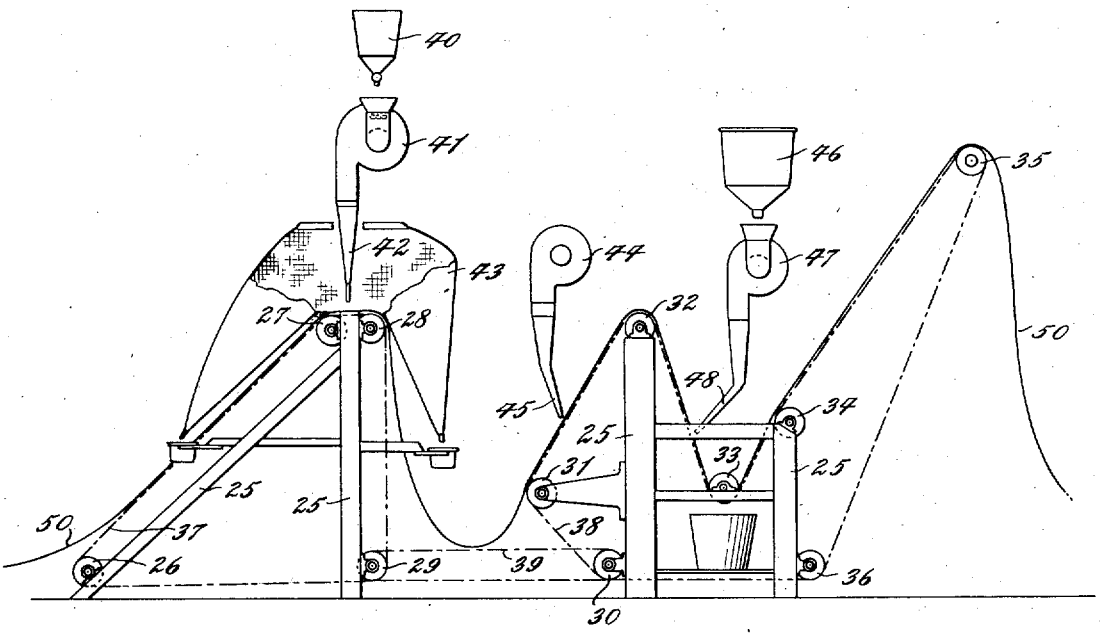
Fig. 4 is a side elevation of a modified apparatus suitable for the carrying out of my process.

Referring to Fig. 1, the machine consists of a suitable framework 1 upon which are mounted rollers 2, 3, 4, 6, 7 and 8. Each of the rollers is provided with a sprocket 9 at each end having teeth which cooperate with a chain 10 attached to the edges of a belt. The belt acts as a support for the material 12 to be decorated. One form of belt is made up as shown in Fig. 5 and consists of a strip of mesh material 11[a] at each edge, which is attached in any convenient manner to chains 10 which pass over two sprockets 5, one at each edge of the belt. In the form shown in Fig. 5, a piece of canvas 11 is placed between the two mesh strips and slats 11[b] are attached to ears or lugs on the chains 10. It is desirable that the cloth, or other material being treated, extend out beyond the edges of the canvas 11 and onto the mesh material so that any beads or other surfacing material may pass out through the openings in the mesh and not get back between the belt and the cloth and cause bumps which would interfere with the operation of surfacing; the canvas and the slats act to support the cloth or other material.

The surfacing material such as finely divided metallic particles, or small glass beads, or other comminuted material, may be placed in the container 13 provided with a controllable outlet 14 through which the particles are allowed to pass into the intake 15 of a rotary fan 16. A rotating distributor 17 is placed in the intake 15 for the purpose of distributing the particles as they go into the fan. The fan 16 is driven by any suitable means and forces the particles onto the cloth 12 through a nozzle 18, which causes the particles to go onto the material to be treated with considerable force and in a thin flat stream. The nozzle 18 is located as shown in Fig. 1, so that the particles are applied to the material as it passes from roller 3 to roller 4 and a suitable guard 19 surrounds the nozzle and collects the excess surfacing material which falls downwardly into the legs 20 of the guard 19 and from there discharges into receptacles 21, from which it may be taken and placed back in the container 13 for re-use. That part of the guard 19 adjacent the nozzle 18 is arranged to fit rather closely to the material being surfaced, although not sufficiently close to engage the same. To the upper side of the material to be surfaced, there is applied an adhesive substance in wet or soft condition, and this substance may be formed into designs on the flexible material in any suitable way known to the art, or may be spread over the entire surface if so desired.

The particles are applied through the nozzle 18 to the substance while it is wet and the force with which the particles are discharged through the nozzle is sufficient to partially imbed the same therein. The result is that the adhesive substance, whether in spaced designs or covering the surface of the flexible material, becomes partially covered by the particles, although the particles discharged through the nozzle could be in a sufficient quantity to completely cover the adhesive substance. Obviously, those particles which are forced against the cloth where there is no adhesive substance will not adhere thereto permanently. Some of these particles, however, will remain on the adhesive substance, but only a small portion will do so.

Particularly where the invention is used to form designs upon the flexible material, it is often desirable to place fine metallic particles on the designs, as above described, and subsequently thereto apply glass beads or other material to the designs also. The beads referred to here are those well known in the art. These may be applied by placing the same in the receptacle 22 which has a discharge chute 23 for conducting the beads down into the loop in the material which is formed by the passage of the belt, chain and blanket supporting slats 11[b] around the sprockets 5. By placing a substantial quantity of beads in this fold or loop of the material a considerable pressure is produced on those immediately against the adhesive substance. This pressure is sufficient to thoroughly imbed the beads into this substance while it is still plastic, whereupon the beads remain upon the design. The excess of the beads in the trough, or loop which are being continually replenished from receptacle 22, keep working toward the outside of the trough and spill off through netting or mesh in the belt into suitable receptacles. As the material passes up over the roller 6 most of the beads will separate from the material at all places except the designs, where separate designs are being formed. The material is then passed over the roller 7 and from there it is conducted to any suitable place where the adhesive material is permitted to dry and the particles and beads become substantially a unitary part thereof. The beads and/or particles may then be brushed and all loose material removed.

The belt passes around all of the rollers in an endless fashion in the usual well-known manner.

I have shown in Fig. 4 a modification of the apparatus for carrying out the method, which I will describe as being used for forming decorative designs on the flexible material, although it may equally well be used for surfacing an entire sheet. The apparatus comprises a suitable framework 25 provided with rollers 26, 27, 28, 29, 30, 31, 32, 34, 35 and 36. A belt 37 like that heretofore described, is carried on the rollers 26 to 29, inclusive, and a similar belt 38 is carried on the rollers 30 to 36, and a driving belt 39 connects the rollers 29 and 30 together. At 33 is shown a sprocket similar to 5 of Fig. 5, for forming a loop and leaving an open space for the decorating material to fall away as soon as it leaves the material being decorated. Each of the rollers also has sprockets for engagement with the chains at the edges of the belt. Decorating material of the desired character is placed in a receptacle 40 and discharged into the rotary fan 41 and onto the material through the nozzle 42, as already explained. A guard 43 is placed near the nozzle and has the same function as that heretofore explained. A fan 44 blows the excess decorating material from the material being decorated through a nozzle 45 placed close to the material. This insures that the material being decorated will come to the next operation in a clean condition.

Beads, or other suitable material, are placed in the receptacle 46 from which they are introduced into a rotary fan 47 which forces the beads onto the material being decorated through the nozzle 48 in a manner similar to the action through the nozzle 42, and in a sufficient quantity to cause them to keep replenishing the mass of beads or other units in the loop formed by sprocket 33 where they keep working toward the edge of material and spill off through netting or mesh into the receptacle below. The material with the decorations thereon is then run up over the roller 35, and the material 50 which is decorated is then conducted to any desired location where it is permitted to dry, as already described.

Figure 6:
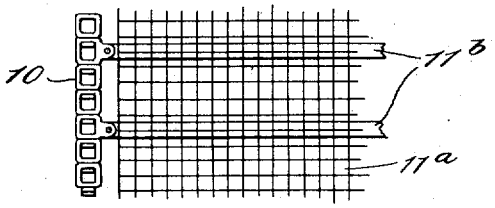
Fig. 6 is a detail showing modified means for carrying the goods through the machine.

In Fig. 6, I have shown a modified form of belt in which the canvas strip is omitted and the netting, or open mesh material, extends from one chain 10 to the other. As in the form shown in Fig. 5, slats 11[c] are also provided.

Figure 7:
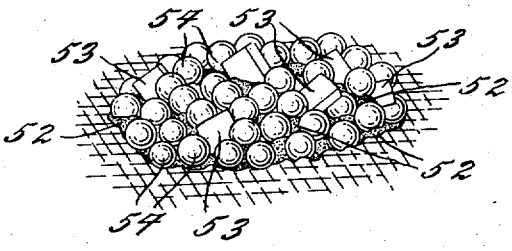
Fig. 7 is a view of one of the decorative units on an enlarged scale, illustrating the preferred position of the decorative elements.

In Fig. 7, I have shown one of the units of a design on an enlarged scale, and have illustrated the arrangement of the decorative material. Obviously, the arrangement shown is partly illustrative, as each unit differs from the other for obvious reasons. It will be seen that a unit consists of a mass of adhesive substance 52 in which metallic particles 53 are imbedded, and in which beads 54 are also partially imbedded in those portions of the adhesive which are not occupied by the particles of metallic. It is understood that a series of dots or units, such as that shown in Fig. 7, are suitably arranged to produce any desired design or configuration. I prefer to separate the units constituting a design so that a small area of the material being decorated will remain undecorated between the units, although, as stated above, it is obvious that the method may be equally well used to form a continuous surfacing for the flexible material. However, by spacing the designs, the result is greater flexibility of the finished product and also results in less liability of breaking or enlarging the design upon the necessary bending of the finished product. In this connection, I call attention to my previously issued Patent No. 1,329,900.

Figure 8:
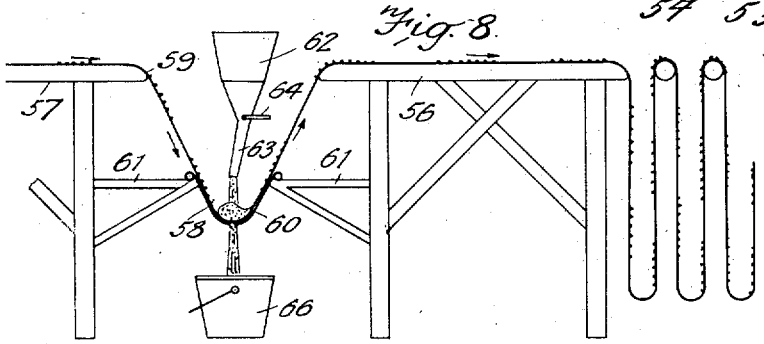
Fig. 8 shows another arrangement of means for decorating material by use of a loop alone.

In Fig. 8, I have illustrated still another form of my invention, which I shall also describe in connection with the formation of separate designs, although here again the method can be used to form a continuous surfacing on the flexible material. In this figure, two tables 56 and 57 are placed in line with each other with a space between. In this space a loop 58 in the material 59 is formed and a support may be used to support cloth or other material at the loop 58. The supporting trough 60 is held in place by brackets 61 on the tables. A receptacle 62 contains decorating material which may be discharged into the loop 58 through a nozzle 63 controlled by valve 64. As shown in Fig. 8, an excess amount of decorating material 65 is placed in the loop and as the cloth or other material 59 is moved with this decorating material thereon the same causes a pressure which forces the particles of decorating material into the wet designs which have previously been placed on the cloth or other material. As the material to be decorated passes through the loop some of the decorating material remains thereon and this is replenished from the receptacle 62. The decorating material also passes out and over the edges of the material into suitable receptacles 66 from which the material may be placed back in the receptacle 62 and again placed in the loop. The process above described may be a continuous one as when decorating cloth in the piece or it may be intermittent where it is desired to decorate lengths of material.

When metallic particles and beads, or other similar decorating material, are both used, the metallic usually covers only a portion of the units and the beads, or other material, cover the remaining portion of the adhesive mass of each unit. As is well known, the metallic particles have sharp edges, whereas the beads, or similar products, are relatively smooth. By placing the metallic on the adhesive first and applying the beads thereafter, the metallic particles are imbedded to a deeper degree than the beads in the adhesive and the sharp points and edges thereof are protected by the beads and the units are given a smoother surface than would be the case if the decoration were done with the metal particles only.

The chief difference between the form of apparatus shown in Fig. 1 and that shown in Fig. 4 is a separation of the means for applying the metallic particles and that for applying beads, or similar material, so that the metallic particles and beads do not become mixed in the operation of the apparatus, as shown in Fig. 4, as they do to some extent in that shown in Fig. 1.

While I prefer to use both metallic and beads or material similar to each of these in decorating the material, I may use one of such materials alone without the other. In such a case the trough, or loop, such as that shown around the sprockets 5 in Fig. 1 and around the sprockets 33 in Fig. 4 alone, may be used to apply the decorating material, although the nozzle may be used alone or both together with the same material, but they are not necessary.

Usually it is advisable to brush the finished product after the same has become completely dried so as to remove any loosely adhering decorating material therefrom.

By the use of the foregoing apparatus and process indefinite lengths of material may be surfaced rapidly and therefore economically, and I have successfully surfaced material with this machine at a much more rapid rate than has been possible with any machine or method heretofore used, to my knowledge. Material may be passed through the machine at a speed of about 18 yards per minute. The machine and method, therefore, have many advantages which will be obvious to those skilled in the art.

I may use a loop alone formed by a belt or by letting the weight of the surfacing material force the cloth itself into a rigid trough so that as the cloth is pulled the weight of the surfacing material continually forces the cloth being surfaced into a loop in the trough and the surfacing material keeps working toward the edge of the cloth where it may spill off into receptacles. The cloth may run free so that a loop is formed by reason of the weight of the cloth and the surfacing material and as the cloth is pulled along the surfacing material forces itself into the wet adhesive and also keeps working toward the edges of the cloth and spills off. The loop is continually formed by new cloth to be surfaced.

While I have described selected embodiments of apparatus for practicing my invention, and also described certain ways of practicing the invention in more or less detail, nevertheless it is to be understood that I do not intend to thus limit myself, as various changes may be made without departing from the scope of the invention. For example, while the invention is described as being used in connection with beads and/or metallic particles for surfacing material, it may equally well be used when other material is used; for example, flock or any flocculent material.

I claim:

1. The method of decorating sheet material which consists in applying a series of designs to the material, forming a loop in the material bearing the designs, placing an excess amount of decorating material in the loop and moving the material being decorated whereby decorating material will be imbedded by its own weight in the material of the designs.

2. The method of decorating sheet material which consists in applying a series of designs to the material, continuously moving the material and forming a loop therein, supporting said material on an open-mesh work support, supplying an excess of decorating material to said supported loop, whereby decorating material is imbedded in the designs and the excess decorating material allowed to escape over the edges of the material being decorated.

3. The method of decorating sheet material which consists in applying a series of designs to the material, continuously moving the material and forming a loop therein, supporting said material on an open-mesh work support, supplying an excess of decorating material to said loop, whereby decorating material is imbedded by its own weight in the designs, and the excess decorating material passes continuously off the edges of the material being decorated.

4. The method of decorating cloth in the piece which consists in placing a design thereon, continuously moving the cloth and at the same time forcing metallic particles on the wet design, forming a loop in the material, applying an excess of beads to said loop whereby said beads are imbedded in the design by their own weight, removing the excess beads and drying the design.

5. The method of decorating cloth in the piece which consists in applying a design thereto, forcing metallic particles into the wet design while the cloth is in motion, removing the excess particles, forming a loop in the material, supporting said loop on an open-mesh support, forcing beads into the design and removing the excess beads over the edges of said material and through the open-mesh support.

6. The method of decorating material which consists in placing designs on the material, forcing fine particles of a metallic nature onto the designs with sufficient force to partially imbed the particles in the material of the designs, removing the excess particles and then forcing beads onto the designs with sufficient force to partially imbed the beads in the design material.

7. The method of decorating material, consisting of applying a design to the material, forcing metallic particles on the material while the design it wet so as to partially cover the surface of the design, removing the excess particles and forcing beads on the material also while the design is wet so that said beads adhere to the design not covered by said particles, and removing the excess beads therefrom.

8. The method of decorating cloth in the piece which consists in placing a design thereon, continuously moving the cloth and at the same time forcing metallic particles on the wet design to cover a portion only of the design, continuously forcibly applying beads to the design to cover the remaining portions of the design, removing the excess beads and drying the design.

9. The method of decorating cloth in the piece which consists in applying a design thereto, forcing metallic particles into the wet design while the cloth is in motion to cover a portion only of the design, removing the excess particles, forcing beads into the design to cover the remaining portion of the design and removing the excess beads.

10. The method of decorating material which consists in placing designs on the material, forcing fine particles of a metallic nature onto the designs with sufficient force to partially imbed the particles in the material of the designs to cover a portion of the surface of the designs, removing the excess particles and then forcing beads onto the designs with sufficient force to partially imbed the beads in the remaining uncovered design material.

11. The method which consists in applying an adhesive to a piece of sheet material, forming a loop in the material, placing an excess amount of surfacing material in the loop, and moving the piece of material whereby the surfacing material will be partially imbedded in the adhesive.

12. The method of surfacing a sheet material which comprises applying adhesive to said sheet, placing on the sheet a mass of small particles surfacing material in excess of that required for the surfacing, whereby the weight of said excess will cause material to become imbedded in said adhesive, and removing the excess material.

13. The method of surfacing a sheet material which comprises applying adhesive to said sheet, placing on the sheet a mass of small particles surfacing material in excess of that required for the surfacing, whereby the weight of said excess will cause material to become imbedded in said adhesive, removing the excess material, and continually moving said material with respect to the mass of surfacing material in such a way that said mass will continually fall on fresh portions of the sheet material.

14. The method of surfacing a sheet material which comprises applying adhesive to said sheet, placing on the sheet a mass of small particles surfacing material in excess of that required for the surfacing, whereby the weight of said excess will cause material to become imbedded in said adhesive, removing the excess material, and recovering said excess surfacing material.

15. The method which consists in applying an adhesive to a piece of sheet material, forming a loop in the material, placing an excess amount of surfacing material in the loop, moving the piece of material whereby the surfacing material will be partially imbedded in the adhesive, and continually replenishing said surfacing material.

CHARLES A. HANINGTON.